A. V. HODGSON.
RETURN SPRING FOR DUMPING RAKES.
APPLICATION FILED JULY 12, 1918.
1,303,899.  Patented May 20, 1919.
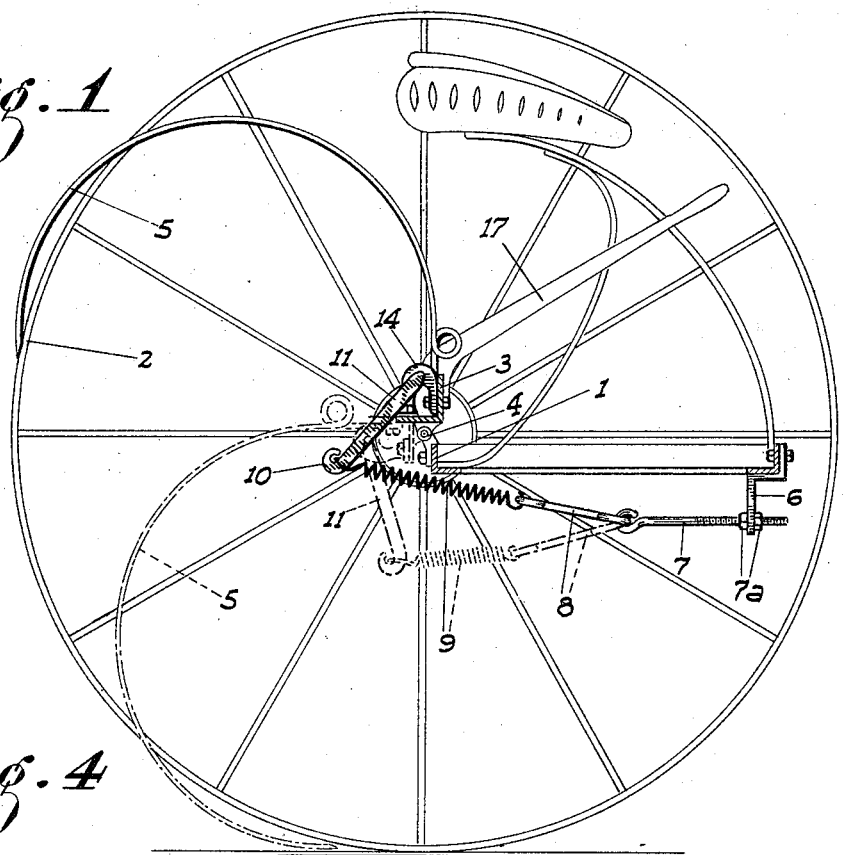
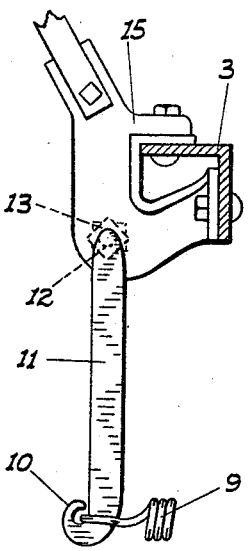
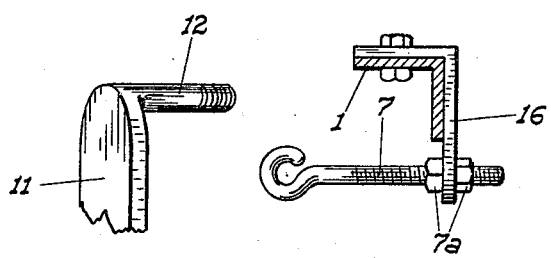
INVENTOR.
Arthur V. Hodgson
BY
ATTORNEY

UNITED STATES PATENT OFFICE.

ARTHUR V. HODGSON, OF CECIL, OREGON.

RETURN-SPRING FOR DUMPING-RAKES.

1,303,899.   Specification of Letters Patent.   Patented May 20, 1919.

Application filed July 12, 1918. Serial No. 244,529.

*To all whom it may concern:*

Be it known that I, ARTHUR V. HODGSON, a citizen of the United States of America, residing at Cecil, in the county of Morrow, State of Oregon, have invented certain new and useful Improvements in Return- Springs for Dumping-Rakes; and I do declare the following to be a clear, full, and exact description of the same, reference being had to the accompanying drawings, and to the characters of reference marked thereon, which form a part of this application.

This invention relates to improvements in power-driven hay rakes, and particularly to that type known as dumping rakes. The principal object of the invention is to provide a means whereby the rake teeth will be returned to the ground quickly after the dumping dogs are released.

The present method used in this type of rake is to allow the rake teeth to return to the ground by gravity alone. This is a very slow method, and allows some of the hay to be carried over and strung out beyond the windrow proper, for several feet while the teeth are slowly returning to the ground, thus making a wide and scattered windrow which is very hard to handle.

On the other hand, with my attachment the rake teeth are brought promptly, but smoothly, to the ground after dumping hay, thus making a neat and narrow windrow which is very easy to cock or bunch. This device may be used with either the hand dumping or self dumping type.

A further object of the invention is to provide a device for this purpose which will be automatic in its action and will need no attention of any kind after once installed.

A still further object is to produce such a device as will be simple and inexpensive in construction and yet extremely effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 1 is a side elevation with one wheel removed of a dumping rake with my improved device attached thereto, the rake teeth being shown in raised position.

Fig. 2 is a fragmentary view of a portion of the rake-head attachment bar.

Fig. 3 is a side elevation of a modified form of rake-frame attachment and an adjustment rod in connection therewith.

Fig. 4 shows a modified means of attaching the rake-head bar.

Referring now more particularly to the characters of reference on the drawings, the numeral 1 designates the main frame of the rake having the usual wheels 2 in connection with the rake-head 3 which is hinged to the frame 1 by the usual hinges 4 and having rake-teeth 5 attached thereto. Bolted centrally to the forward end of the main frame 1, which is usually of angle-iron construction, is a Z-shaped casting or forging 6 extending below the frame angle and having an adjustment eye-bolt 7 passing therethrough with lock nuts 7$^a$ thereon to effect adjustment. Coupled to the eye-bolt 7 is an eye-bar 8 through one end of which passes one end of a helical spring 9 of a suitable length, the other end of which is fastened to an eye 10 at the lower end of a flat bar 11 which may be curved or straight as may be necessary to fit any particular type of rake. The bar 11 has a bolt portion 12 formed at right angles to the bar at the top thereof, having lock nuts 13 thereon to secure the bar loosely in position on a V-shaped casting 14 suitably shaped to be bolted to the rake head 3. Should the usual hand lever casting 15, as shown in Fig. 4, be adaptable for the purpose, I attach the bar 11 thereto instead of attaching the member 14. For use with rake-frames in which the position of the angle iron is reversed from that shown in Fig. 1, I provide a forging or casting 16 of L-shape to be used in place of the member 6.

In the operation of the device, when the rake has been raised to the position shown in Fig. 1, either by the hand lever 17 or by the automatic dumping devices used on some rakes, the spring 9 is brought into tension and when the dumping mechanism is released, the teeth are brought back to the ground quickly by reason of the pull on the spring which only operates for a small portion of the downward travel of the rake head. Adjustment for the tension of the spring is provided for by the adjustment rod 7 and lock nuts 7$^a$ thereon. The eye-bar 8 gives greater flexibility to the device than if the pull of the spring was directly on the eye-bolt 7.

While most rakes now in use are constructed in either of the two forms I have shown and provided for, it is understood that slight modifications of construction would adapt my device to fit any rakes operating on this principle.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claim.

Having thus described my invention, what I claim as new and useful and desire to secure by Letters Patent is:—

A spring return device for dumping rakes comprising a bracket attached to the rear of a rake head of inverted L-shaped section and under the same, a downwardly extending bar pivotally mounted to the bracket, and a helical spring normally at rest fastened at one end to the lower end of the bar and pivoted at the other end to the main rake frame, the bar being adapted for fore and aft swinging about its pivotal point until the teeth or the rake head have nearly reached their upmost position, when it impinges against the rake head, whereby the radial length of the spring from its pivotal point to the bar is not increased until such point of bearing of the bar against the rake head is reached, and the spring not placed in tension until then.

In testimony whereof I affix my signature in presence of two witnesses.

ARTHUR V. HODGSON.

Witnesses:
 BOYD LOGAN,
 J. M. DAVIS.

Copies of this patent may be obtained for five cents each, by addressing the "Commissioner of Patents, Washington, D. C."